United States Patent [19]
Nagahara

[11] Patent Number: 5,847,260
[45] Date of Patent: Dec. 8, 1998

[54] PHYSICAL PARAMETER SENSOR WITH SELF-DIAGNOSIS CIRCUIT

[75] Inventor: Teruaki Nagahara, Tokyo, Japan

[73] Assignee: Mitsubishi Denki Kabushiki Kaisha, Tokyo, Japan

[21] Appl. No.: 23,708

[22] Filed: Feb. 13, 1998

[30] Foreign Application Priority Data

Aug. 12, 1997 [JP] Japan .................................. 9-217378

[51] Int. Cl.$^6$ ................................................ G01F 11/00
[52] U.S. Cl. ............................................................ 73/1.01
[58] Field of Search ................................. 73/1.01, 1.07, 73/1.37, 1.61, 1.62, 765, 766, 862.622, 708; 395/183.13–183.15, 185.01–185.1

[56] References Cited

U.S. PATENT DOCUMENTS 5,577,199  11/1996  Tanabe et al. .

FOREIGN PATENT DOCUMENTS

A-5218852  8/1993  Japan .

*Primary Examiner*—Robert Raevis

[57] ABSTRACT

A physical parameter sensor that can detect changes in data that is stored beforehand in the data storage section for adjustments when the changes in the data are not corrected by a majority-decision circuit section. The physical parameter sensor can prevent the use of an output signal obtained by adjustments based on incorrect data. The physical parameter sensor has a self-diagnosis circuit section that detects whether a plurality of data words stored in a data storage section is identical or not and outputs an error signal, if the identical data words have been altered to become nonidentical.

4 Claims, 7 Drawing Sheets

Fig.1

1: Physical parameter sensor

Fig.2

13: Amplifier circuit

PHYSICAL PARAMETER SENSOR WITH SELF-DIAGNOSIS CIRCUIT

BACKGROUND OF THE INVENTION

1. Field of the Invention

The present invention relates to physical parameter sensors that detect a physical parameter such as acceleration, pressure, or angular velocity and more particularly a physical parameter sensor that can adjust the characteristics.

2. Description of the Related Art

Figure 9:
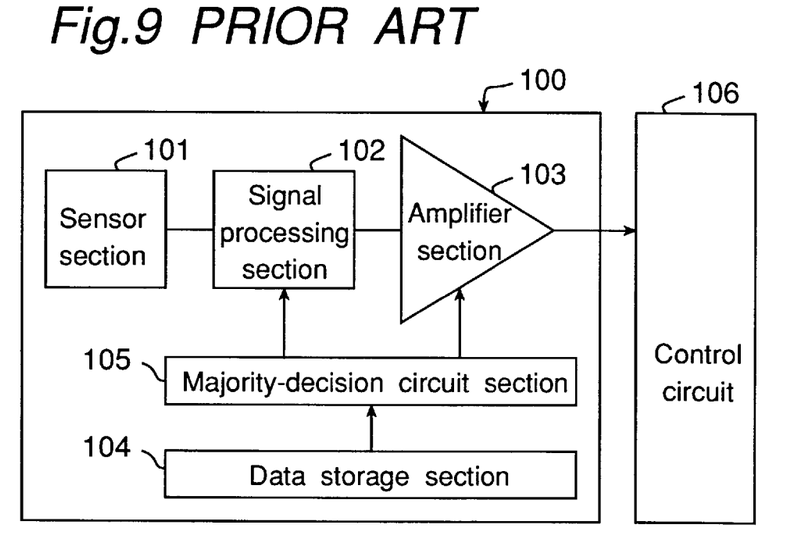
FIG. 9 is a block circuit diagram illustrating a publicly-known prior physical parameter sensor.

FIG. 9 is a block circuit diagram that illustrates a prior physical parameter sensor. Referring to the figure, a physical parameter sensor 100 comprises a sensor section 101 that detects a physical parameter such as acceleration, pressure, or angular velocity to convert into an electric signal, a signal processing section 102 that compensates for a temperature dependent change of the electric signal and adjusts the offset voltage, an amplifier section 103 that amplifies the signal output from sensor section 101 and processed in signal processing section 102, a data storage section 104 that stores digital data that is used for adjusting the offset voltage in signal processing section 102 and for adjusting the gain in amplifier section 103, and a majority-decision circuit section 105. The output of amplifier section 103 is the output of physical sensor 100 and applied to a control circuit 106 that comprises a micro processor and others.

Data storage section 104 stores a plurality of digital data words that consist of data for adjusting the offset voltage and data for adjusting the gain. The digital data words are identical words. Majority-decision circuit section 105 performs a majority decision for each set of corresponding bits in the digital data words to output the digital data word generated by the majority decision into signal processing section 102 and amplifier section 103. Here, referring to the following Table 1, we shall explain the operation of majority-decision circuit section 105 in a little more detail for the case in which data storage section 104 stores the first, second, and third data words as identical 6-bit digital words.

TABLE 1

| Bit No. | 1 | 2 | 3 | 4 | 5 | 6 |
|---|---|---|---|---|---|---|
| First data word | 1 | 0 | 1 | 1 | 0 | 0 |
| Second data word | 1 | 0 | (0) | 1 | 0 | 0 |
| Third data word | 1 | 0 | 1 | 1 | 0 | 0 |
| Majority decision | 1 | 0 | 1 | 1 | 0 | 0 |

As shown in Table 1, if the third bit of the second data word stored in data storage section 104 is altered from 1 into 0 by some cause, majority-decision circuit section 105 performs a majority decision for the third bits of the three data wards to output 1 as the third bit of the majority decision, since the third bits of the first and third data words are 1. Of course, majority-decision circuit section 105 also outputs the other identical corresponding bits of the three data words. In this way, even if part of the data words stored in data storage section 104 is altered, a correct data word is output into signal processing section 102 and amplifier section 103 by majority-decision circuit section 105.

However, in the present case, if more than one corresponding bit of the three data words have been altered, then majority-decision circuit section 105 cannot correct the errors and outputs a false data word. For example, as shown in the following Table 2, if the fourth bits of the first and second data words have been altered from 1 into 0, then 0 is output as the fourth bit by the majority decision.

TABLE 2

| Bit No. | 1 | 2 | 3 | 4 | 5 | 6 |
|---|---|---|---|---|---|---|
| First data word | 1 | 0 | 1 | (0) | 0 | 0 |
| Second data word | 1 | (1) | 1 | (0) | 0 | 0 |
| Third data word | 1 | 0 | 1 | 1 | 0 | 0 |
| Majority decision | 1 | 0 | 1 | (0) | 0 | 0 |

SUMMARY OF THE INVENTION

An object of the present invention is therefore to solve the problem described above and to provide a physical parameter sensor that can detect changes in data stored beforehand for adjustments when the changes in the data are not corrected by a majority-decision circuit section and that can prevent the using of an output signal obtained by adjustments based on incorrect data.

In order to achieve the aforementioned objective, a physical parameter sensor in accordance with the present invention comprises a sensor section that converts a physical parameter into an electric signal, a signal processing section that performs signal processing of the electric signal converted by the sensor section, an amplifier section that amplifies the signal processed by the signal processing section, a data storage section that stores, as identical data words, the digital data that is used for adjusting the signal processing performed by the signal processing section and for adjusting the amplifier section, a majority-decision circuit section that performs a majority decision for each set of corresponding bits in the digital data words to output the digital data word generated by the majority decision into the signal processing section and the amplifier section, and a self-diagnosis circuit section that detects whether the data words stored in the data storage section are identical or not and outputs an error signal into the outside of the sensor, if they are not identical.

According to the present invention, the physical parameter sensor uses the self-diagnosis circuit section that monitors whether a plurality of identical data words stored in the data storage section is kept identical or not and outputs an error signal into the outside of the sensor, if the originally identical data words have been altered by some cause to become nonidentical. Consequently, the present invention can detect changes in data that is stored beforehand in the data storage section for adjustments when the changes in the data are not corrected by the majority-decision circuit section. Further, the present invention can prevent the use of an output signal obtained by adjustments based on incorrect data, so that the present invention can improve reliability.

The self-diagnosis circuit section is preferably composed of a judgment circuit section and an error-signal output section. The judgment circuit section judges in units of bits whether the data words stored in the data storage section are identical or not and outputs the judgment results. The error-signal output section generates and outputs a predetermined error signal if the judgment circuit section outputs the judgment results indicating that the data words are not identical. By these means, the present invention can detect changes in data that is stored beforehand in the data storage section for adjustments when the changes in the data are not corrected by the majority-decision circuit section. Further, the present invention prevents the use of an output signal obtained by adjustments based on incorrect data, so that the present invention can improve reliability.

The judgment circuit section preferably has inputs that correspond to the number of data words stored in the data storage section and is preferably formed of exclusive NOR circuits that correspond to the number of bits in each data word stored in the data storage section. The error-signal output section is preferably formed of a NAND circuit that has inputs corresponding to the exclusive NOR circuits. Alternatively, the judgment circuit section has inputs that correspond to the number of data words stored in the data storage section and may be formed of exclusive OR circuits that correspond to the number of bits in each data word stored in the data storage section. In this case, the error-signal output section is formed of a NOR circuit that has inputs corresponding to the exclusive OR circuits. In either case, the present invention can realize, by means of simple circuits, the detection of changes in data that is stored beforehand for adjustments in the data storage section when the changes in the data are not cannot be corrected by the majority-decision circuit section. The present invention can prevent the use of an output signal obtained by adjustments based on incorrect data, so that the present invention can improve reliability.

BRIEF DESCRIPTION OF THE DRAWINGS

These and other objects and features of the present invention will become clear from the following description taken in conjunction with the preferred embodiment thereof and the accompanying drawings throughout which like parts are designated by like reference numerals, and in which.

DETAILED DESCRIPTION OF THE PREFERRED EMBODIMENT

The preferred embodiment according to the present invention will be described below in conjunction with the attached drawings.

Figure 1:
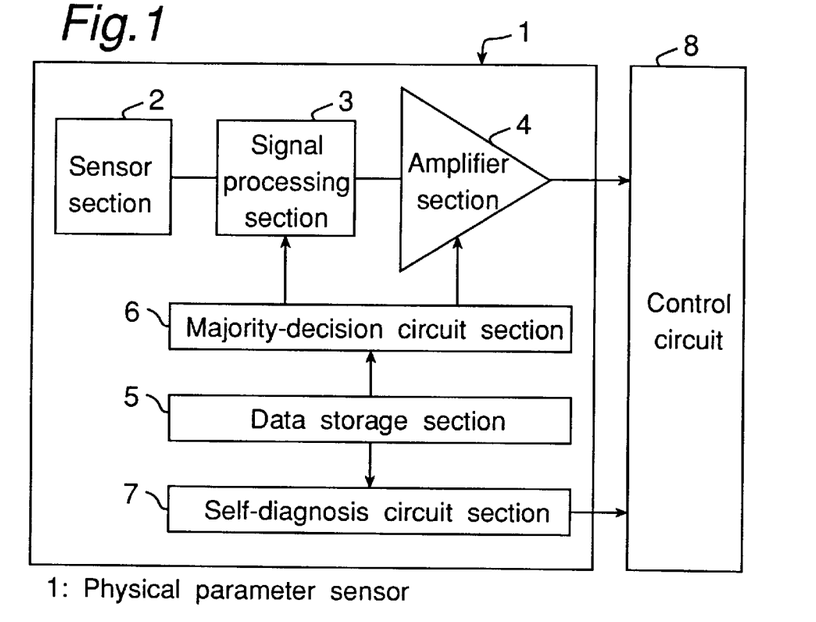
FIG. 1 is a block circuit diagram illustrating a physical parameter sensor in accordance with the present invention.

FIG. 1 is a block circuit diagram illustrating a physical parameter sensor in accordance with the present invention. Referring to FIG. 1, the physical parameter sensor 1 comprises a sensor section 2 that detects a physical parameter such as acceleration, pressure, or angular velocity to convert into an electric signal, a signal processing section 3 that compensates for a temperature dependent change of the electric signal and adjusts the offset voltage, an amplifier section 4 that amplifies the signal output from sensor section 2 and processed in signal processing section 3, a data storage section 5 that consists of ROM and stores digital data that is used for adjusting the offset voltage in signal processing section 3 and for adjusting the gain in amplifier section 4, a majority-decision circuit section 6, and a self-diagnosis circuit section 7 that detects changes in the data stored in data storage section 5.

Sensor section 2 is connected to signal processing section 3. Signal processing section 3 is connected to amplifier section 4. The output of amplifier section 4 is an output of physical parameter section 1 and applied to a control circuit 8 that consists in a micro computer. Data storage section 5 is connected to signal processing section 3 and amplifier section 4 through majority-decision circuit section 6. Further, data storage section 5 is connected to self-diagnosis circuit section 7. The output of self-diagnosis circuit section 7 is an output of physical parameter sensor 1 and applied to control circuit 8. Control circuit 8 performs predetermined processing based on the signals output from physical parameter sensor 1.

Digital data consisting of data for adjusting offset voltage and data for adjusting gain are stored as a plurality of data words in data storage section 5. The digital data words are identical. Majority-decision circuit section 6 performs a majority decision for each set of corresponding bits in the digital data words. The digital data word generated by the majority decision is output into signal processing section 3 and amplifier section 4. Self-diagnosis circuit section 7 judges whether the digital data words stored in data storage section 5 are identical or not and outputs the judgment results into control circuit 8.

Figure 2:
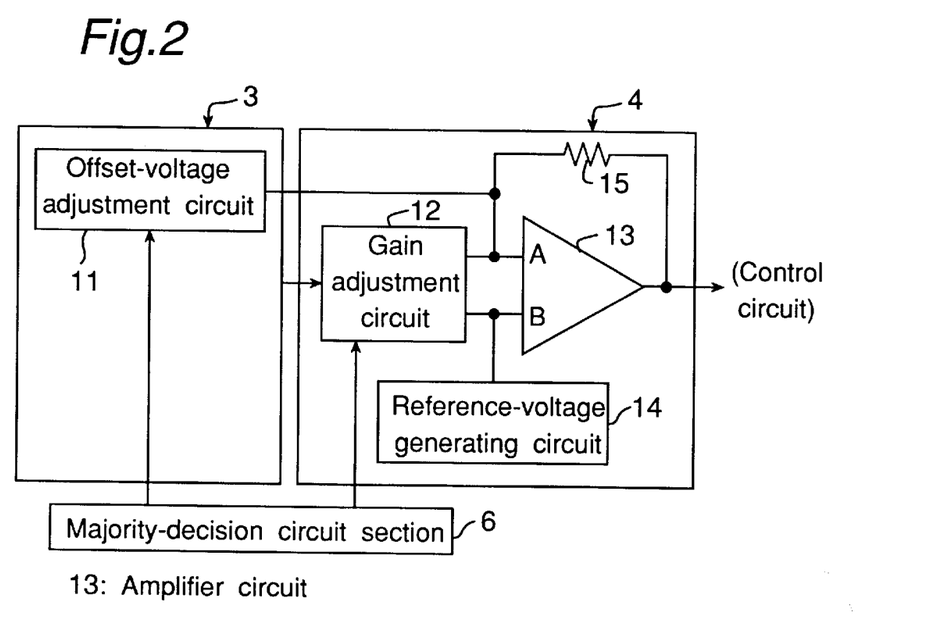
FIG. 2 is a circuit diagram illustrating the amplifier section 4 in FIG. 1.

Next, Referring to FIG. 2 that illustrates a block circuit diagram of amplifier section 4, signal processing section 3 has an offset-voltage adjustment circuit 11 that adjusts the offset voltage in signal processing section 3. Amplifier section 4 comprises a gain adjustment circuit 12 that adjusts the gain, an amplifier circuit 13 that consists in an op-amp, a reference-voltage generating circuit 14, and a resistor 15. Gain adjustment circuit 12 and offset-voltage adjustment circuit 11 are connected to an input A of amplifier circuit 13. Resistor 15 is connected between the terminal A of amplifier circuit 13 and the output.

Gain adjustment circuit 12 and reference-voltage generating circuit 14 are connected to the other input of B of amplifier circuit 13. Gain adjustment circuit 12 is also connected to signal processing section 3. Reference-voltage generating circuit 14 is a circuit that generates a reference voltage VR. Offset-voltage adjustment circuit 11 and gain adjustment circuit 12 are connected to majority-decision circuit section 6.

Figure 3:
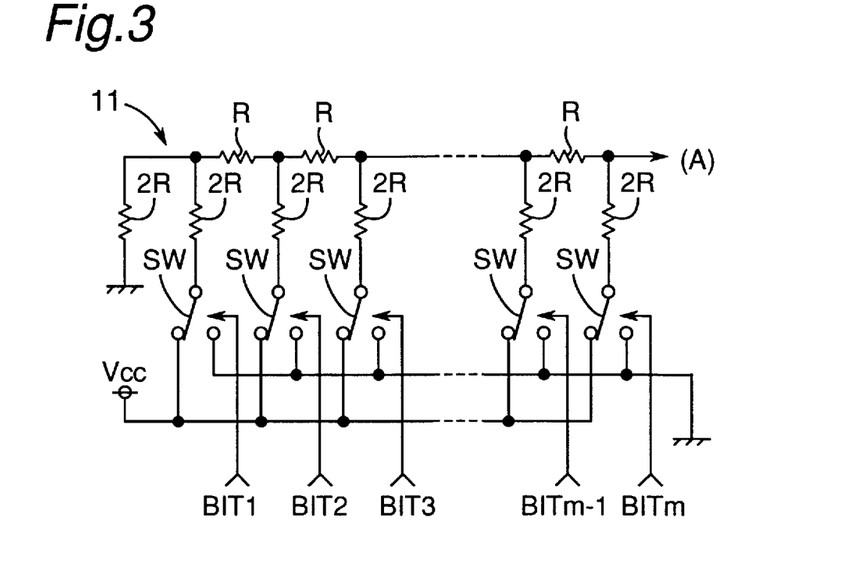
FIG. 3 is a circuit diagram illustrating the offset-voltage adjustment circuit 11 in FIG. 2.

FIG. 3 illustrates the circuit of offset-voltage adjustment circuit 11. In FIG. 3, data that is stored in data storage section 5 for adjusting offset voltage is represented by a data word consisting of BIT1 to BITm, where m is a natural number.

Referring 3, offset-adjustment circuit 11 is formed of an R/2R ladder-type D/A converter that is composed of m−1 resistors R, m+1 resistors 2R, and m semiconductor switches SW. Each of the semiconductor switches SW uses BIT1 to BITm of the data that is for adjusting offset-voltage and output from majority-decision circuit section 6. Each of the switches SW then connects each of the resistors 2R to the source voltage Vcc or to the ground. In this way, offset-voltage adjustment circuit 11 switches each switch so that the resistor connected to the switch should be applied to the source voltage Vcc or to the ground depending on the corresponding data bit input from majority-decision circuit section 6. Therefore, offset-voltage adjustment circuit 11 adjusts the offset voltage by varying the voltage applied to the input A of amplifier circuit 13 in FIG. 2.

Figure 4:
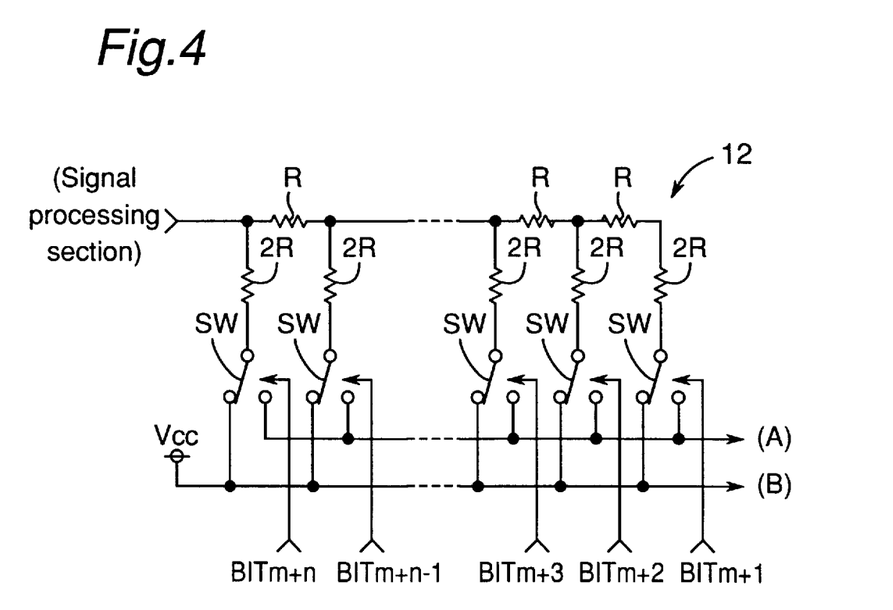
FIG. 4 is a circuit diagram illustrating an example of the gain adjustment circuit 12 in FIG. 2.

FIG. 4 illustrates a circuit of gain adjustment circuit 12. In FIG. 4, data for adjusting the gain is represented by a data word consisting of BITm+1 to BITm+n, where n is a natural number. Referring to FIG. 4, gain adjustment circuit 12 is formed of an R/2R ladder-type D/A converter that is composed of n−2 resistors R, n resistors 2R, and n semiconductor switches SW.

Each of the semiconductor switches SW uses BITm+1 to BITm+n of the data that is used for adjusting the gain and output from majority-decision circuit section 6. Each of the switches SW then applies each of the resistors 2R to the input A of amplifier circuit 13 or to the input B. In this way, gain adjustment circuit 12 switches each switch so that the resistor connected to the switch should be applied to the input A of amplifier circuit 13 in FIG. 2 or to the input B depending on the corresponding data bit input from majority-decision circuit section 6. Therefore, gain adjustment circuit 12 adjusts the gain by varying the current flowing in resistor 15 of amplifier circuit 13 in FIG. 2.

Figure 5:
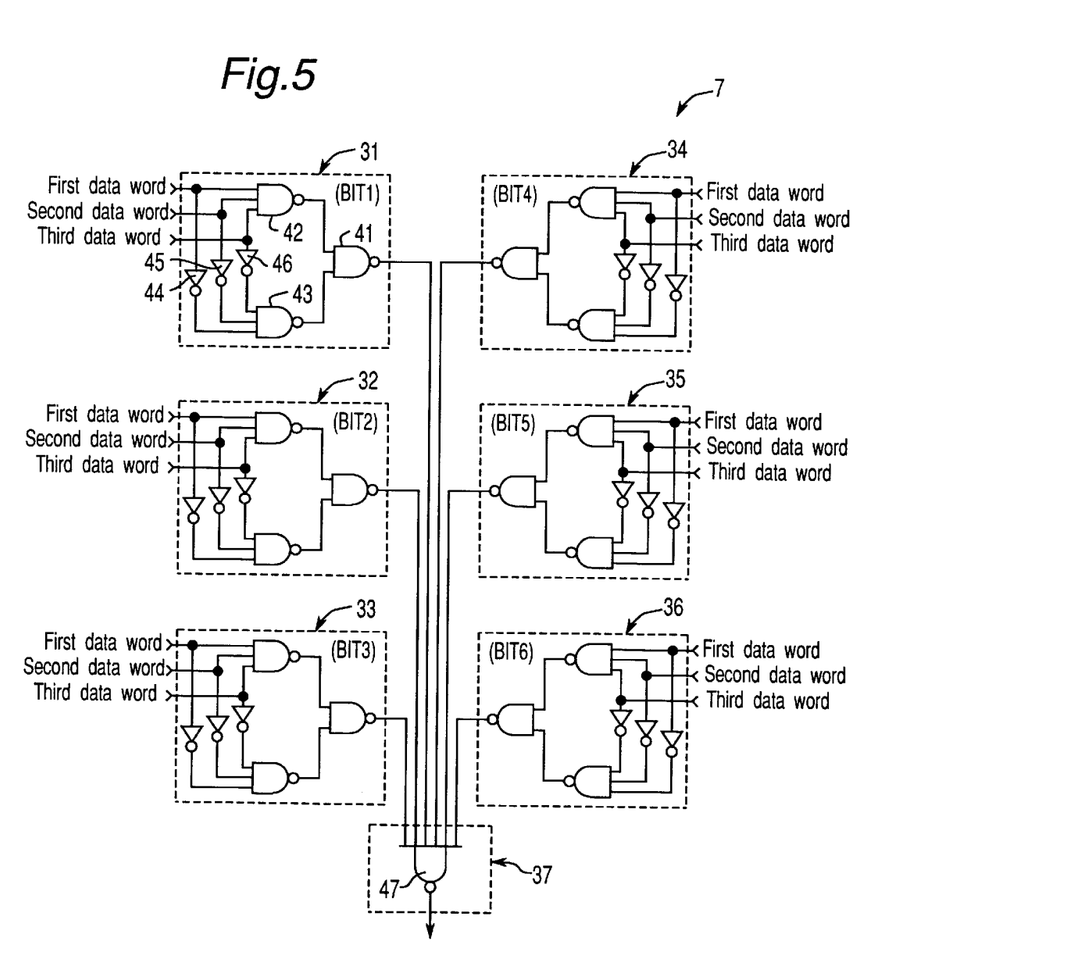
FIG. 5 is a circuit diagram of the self-diagnosis circuit section 7 in FIG. 1.

Next, FIG. 5 illustrates the circuit of self-diagnosis circuit section 7. In FIG. 5, the (m+n)–bit data words stored in data storage section 5 is represented by 6-bit words, and data storage section 5 stores the identical first to third 6-bit words. Further, the bits of each data word stored in data storage section 5 are denoted by BIT1 to BIT6.

Referring to FIG. 5, self-diagnosis circuit section 7 consists of first to sixth judgement circuits 31 to 36 that judge in units of bits whether the corresponding bits BIT1 to BIT6 of the first to third data words are identical or not and an error-signal output circuit 37 that detects whether a change in the first to third data words stored in data storage section 5 has occurred or not and outputs a predetermined error signal into control circuit 8 if it detects a change. Here, first to sixth judgment circuits 31 to 36 constitute the judgment circuit section, and error-signal output circuit 37 constitutes the error-signal output section.

First judgment circuit 31 judges whether BIT1 of the first to third data words are identical or not; second judgment circuit 32 judges whether BIT2 of the first to third data words are identical or not; third judgment circuit 33 judges whether BIT3 of the first to third data words are identical or not; fourth judgment circuit 34 judges whether BIT4 of the first to third data words are identical or not; fifth judgment circuit 35 judges whether BIT5 of the first to third data words are identical or not; and sixth judgment circuit 36 judges whether BIT6 of the first to third data words are identical or not.

Each input of first to sixth judgment circuits 31 to 36 is connected to data storage section 5, and each output of first to sixth judgment circuits 31 to 36 is connected to error-signal output circuit 37. BIT1 of the first to third data words are input to first judgment circuit 31; BIT2 of the first to third data words are input to second judgment circuit 32; BIT3 of the first to third data words are input to third judgment circuit 33; BIT4 of the first to third data words are input to fourth judgment circuit 34; BIT5 of the first to third data words are input to fifth judgment circuit 35; and BIT6 of the first to third data words are input to sixth judgment circuit 36.

Here, the first to sixth judgement circuits 31 to 36 are identical circuits except their different inputs. Therefore, the circuit of first judgement circuit 31 is described in the following.

First judgment circuit 31 is composed of a NAND circuit 41 having 2 inputs, NAND circuits 42, 43, each having 3 inputs, and inverter circuits 44, 45, 46. Error signal-output circuit 37 is formed of a NAND circuit 47 having 6 inputs. Inputs of NAND circuit 42 are respectively applied to the inputs of the inverter circuits 44 to 46. These connections are the inputs of first judgment circuit 31. They are connected to data storage section 5, receiving the BIT1 of the first to third data words.

The outputs of inverter circuits 44 to 46 are respectively applied to the inputs of NAND circuit 43. The outputs of NAND circuits 42, 43 are respectively applied to the inputs of NAND circuit 41. The output of NAND circuit 41 is the output of first judgment circuit 31 and applied to an input of NAND circuit 47. In this circuitry, if all BIT1 of the first to third data words are 0 or if all BIT1 of the first to third data words are 1, then any of BIT1 stored in data storage section 5 has not changed and remained normal. In this case, the output of NAND circuit 41 becomes HIGH level.

If not all BIT1 of the first to third data words are 0 or if not all BIT1 of the first to third data words are 1, then at least one of BIT1 of the three data words stored in data storage section 5 has changed and something abnormal has happened. In this case, the output of NAND circuit 41 becomes LOW level. In this way, first judgment circuit 31 is formed of an exclusive NOR circuit having 3 inputs, called Ex.NOR circuit hereafter, that is composed of NAND circuit 41 having 2 inputs, NAND circuits 42, 43 having 3 inputs, and inverter circuits 44, 45, 46. Similarly, second to sixth judgment circuits 32 to 36 are also formed of Ex.NOR circuits having 3 inputs.

The outputs of NAND circuits 41 in first to sixth judgment circuits 31 to 36 are respectively applied to the inputs of NAND circuit 47 that forms error-signal output circuit 37. If all outputs of NAND circuits 41 of first to sixth judgment circuits 31 to 36 are at HIGH level, then the output of error-signal output circuit 37, that is, the output of NAND circuit 47 becomes LOW level. Therefore, in this case, error-signal output circuit 37 indicates to control circuit 8 that there has been no abnormality in the data stored in data storage section 5. Control circuit 8 then performs predetermined processing of the signal input from amplifier section 4.

If, on the other hand, at least one of the outputs of NAND circuits 41 in first to sixth judgment circuits 31 to 36 is at LOW level, then the output of error-signal output circuit 37, that is, the output of NAND circuit 47 becomes HIGH level. Therefore, in this case, error-signal output circuit 37 indicates to control circuit 8 that there has been an abnormality in the data stored in data storage section 5. Control circuit 8 then performs predetermined processing for the abnormality.

Figure 6:
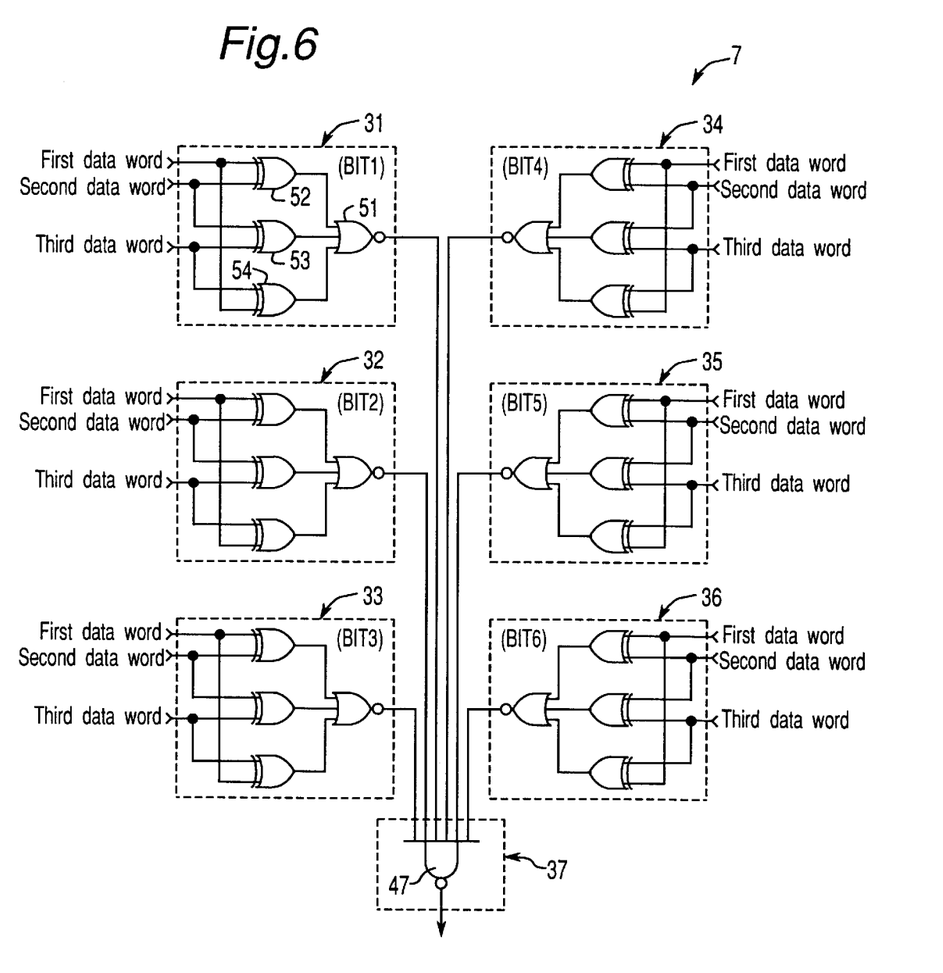
FIG. 6 is a circuit diagram illustrating a variant of the self-diagnosis circuit section 7 in FIG. 1.

The Ex.NOR circuits having 3 inputs that form first to sixth judgment circuits 31 to 36 can be composed by circuitry different from the logic circuits shown in FIG. 5. A different circuit of self-diagnosis circuit section 7 is illustrated in FIG. 6 in the case where first to sixth judgment circuits 31 to 36 are composed of other logic circuits. In FIG. 6, the first to sixth judgement circuits 31 to 36 are identical circuits except their different inputs. Therefore, the circuit of first judgement circuit 31 is described in the following.

Referring to FIG. 6, first judgment circuit 31 is composed of a NOR circuit 51 having 3 inputs and exclusive OR circuits, called Ex.OR circuits hereafter, 52 to 54, each having 2 inputs. Error-signal output circuit 37 is composed of a NAND circuit 47 having 6 inputs. Inputs of NOR circuit 51 are respectively connected to the outputs of Ex.OR circuits 52 to 54. One input of Ex.OR circuit 52 and one input of Ex.OR circuit 54 are connected. This connection is connected to data storage section 5, receiving the BIT1 of the first data word. The other input of Ex.OR circuit 52 and one input of Ex.OR circuit 53 are connected. This connection is connected to data storage section 5, receiving the BIT1 of the second data word. The other input of Ex.OR circuit 53 and the other input of Ex.OR circuit 54 are connected. This connection is connected to data storage section 5, receiving the BIT1 of the third data word. The output of NOR circuit 51 is the output of first judgment circuit 31 and is connected to one of the inputs of NAND circuit 47.

In this circuitry, if all BIT1 of the first to third data words are 0 or if all BIT1 of the first to third data words are 1, then any of BIT1 stored in data storage section 5 has not changed and remained normal. In this case, the output of NOR circuit 51 becomes HIGH level. If not all BIT1 of the first to third data words are 0 or if not all BIT1 of the first to third data words are 1, then at least one of BIT1 of the three data words stored in data storage section 5 has changed and something abnormal has happened. In this case, the output of NOR circuit 51 becomes LOW level.

The outputs of NOR circuits 51 in first to sixth judgment circuits 31 to 36 are respectively applied to the inputs of NAND circuit 47 that forms error-signal output circuit 37. If all outputs of NOR circuits 51 of first to sixth judgment circuits 31 to 36 are at HIGH level, then the output of error-signal output circuit 37, that is, the output of NAND circuit 47 becomes LOW level. Therefore, in this case, error-signal output circuit 37 indicates to control circuit 8 that there has been no abnormality in the data stored in data storage section 5. Control circuit 8 then performs predetermined processing of the signal input from amplifier section 4.

If, on the other hand, at least one of the outputs of NOR circuits 51 in first to sixth judgment circuits 31 to 36 is at LOW level, then the output of error-signal output circuit 37, that is, the output of NAND circuit 47 becomes HIGH level. Therefore, in this case, error-signal output circuit 37 indicates to control circuit 8 that there has been an abnormality in the data stored in data storage section 5. Control circuit 8 then performs predetermined processing for the abnormality.

Figure 7:
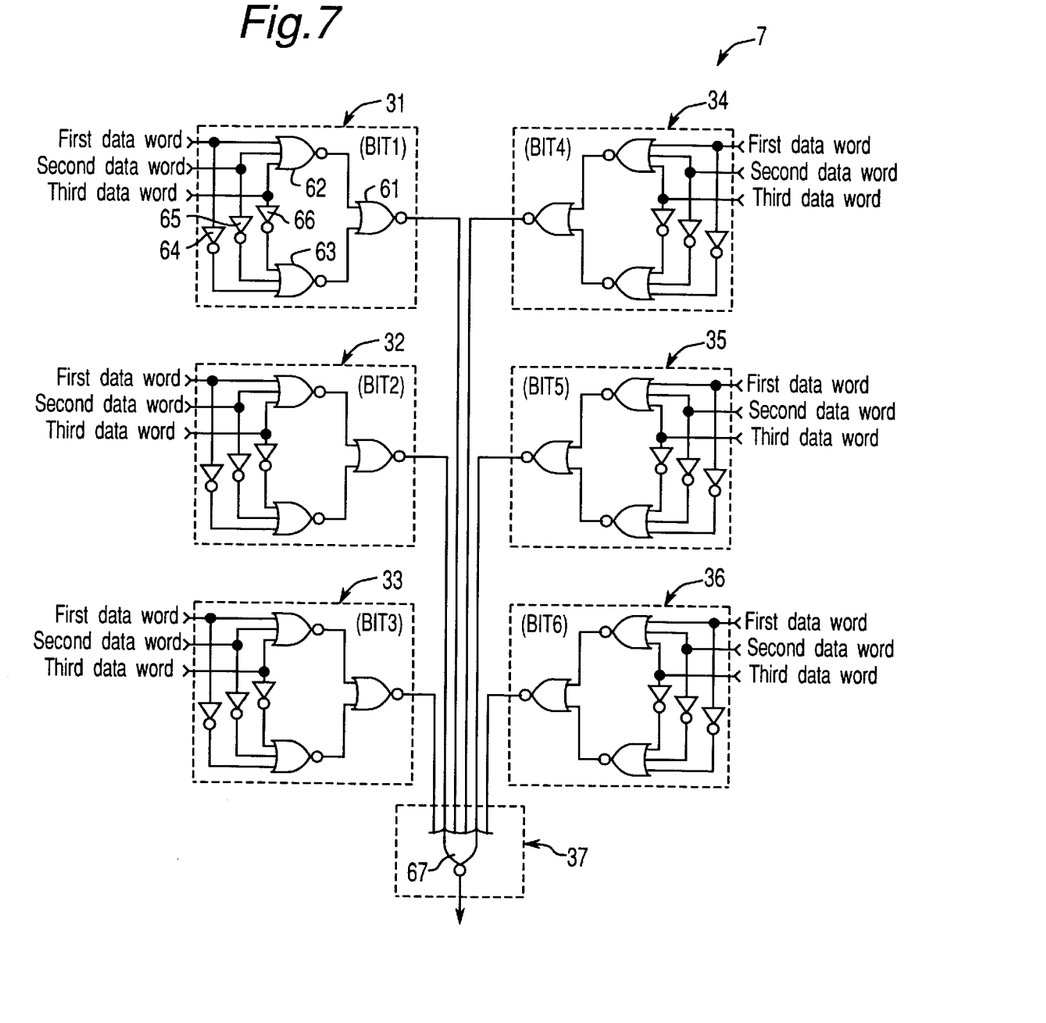
FIG. 7 is a circuit diagram illustrating another variant of the self-diagnosis circuit section 7 in FIG. 1.

The self-diagnosis circuit section 7 of FIGS. 5 and 6 outputs a LOW level signal to control circuit 8, if there has been no abnormality in data stored in data storage section 5. Self-diagnosis circuit section 7 outputs a HIGH level signal to control circuit 8, if detecting an abnormality in data stored in data storage section 5. However, this is an example. Self-diagnosis circuit section 7 may output a HIGH level signal to control circuit 8, if there has been no abnormality in data stored in data storage section 5, and self-diagnosis circuit section 7 may output a LOW level signal to control circuit 8, if detecting an abnormality in data stored in data storage section 5. FIG. 7 illustrates a circuit of self-diagnosis circuit section 7 constructed in this way. In FIG. 7, the first to sixth judgement circuits 31 to 36 are identical circuits except their different inputs. Therefore, the circuit of first judgement circuit 31 is described in the following.

Referring to FIG. 7, first judgment circuit 31 is composed of a NOR circuit 61 having 2 inputs, NOR circuits 62, 63, each having 3 inputs, and inverter circuits 64, 65, 66. Error-signal output circuit 37 is formed of a NOR circuit 67 having 6 inputs. Inputs of NOR circuit 62 are respectively connected to the inputs of the inverter circuits 64 to 66. These connections are the inputs of first judgment circuit 31. They are connected to data storage section 5, receiving the BIT1 of the first to third data words.

The outputs of inverter circuits 64 to 66 are respectively applied to the inputs of NOR circuit 63. The outputs of NOR circuits 62, 63 are respectively applied to the inputs of NOR circuit 61. The output of NOR circuit 61 is the output of first judgment circuit 31 and applied to an input of NOR circuit 67. In this circuitry, if all BIT1 of the first to third data words are 0 or if all BIT1 of the first to third data words are 1, then any of BIT1 stored in data storage section 5 has not changed and remained normal. In this case, the output of NOR circuit 61 becomes LOW level.

If not all BIT1 of the first to third data words are 0 or if not all BIT1 of the first to third data words are 1, then at least one of BIT1 of the three data words stored in data storage section 5 has changed and something abnormal has happened. In this case, the output of NOR circuit 61 becomes HIGH level. In this way, first judgment circuit 31 is formed of an exclusive OR circuit having 3 inputs, called Ex.OR circuit hereafter, that is composed of NOR circuit 61 having 2 inputs, NOR circuits 62, 63 having 3 inputs, and inverter circuits 64, 65, 66. Similarly, second to sixth judgment circuits 32 to 36 are also formed of Ex.OR circuits having 3 inputs.

The outputs of NOR circuits 61 in first to sixth judgment circuits 31 to 36 are respectively applied to the inputs of NOR circuit 67 that forms error-signal output circuit 37. If all outputs of NOR circuits 61 of first to sixth judgment circuits 31 to 36 are at LOW level, then the output of error-signal output circuit 37, that is, the output of NOR circuit 67 becomes HIGH level. Therefore, in this case, error-signal output circuit 37 indicates to control circuit 8 that there has been no abnormality in the data stored in data storage section 5. Control circuit 8 then performs predetermined processing of the signal input from amplifier section 4.

If, on the other hand, at least one of the outputs of NOR circuits 61 in first to sixth judgment circuits 31 to 36 is at HIGH level, then the output of error-signal output circuit 37, that is, the output of NOR circuit 67 becomes LOW level. Therefore, in this case, error-signal output circuit 37 indicates to control circuit 8 that there has been an abnormality in the data stored in data storage section 5. Control circuit 8 then performs predetermined processing for the abnormality.

Figure 8:
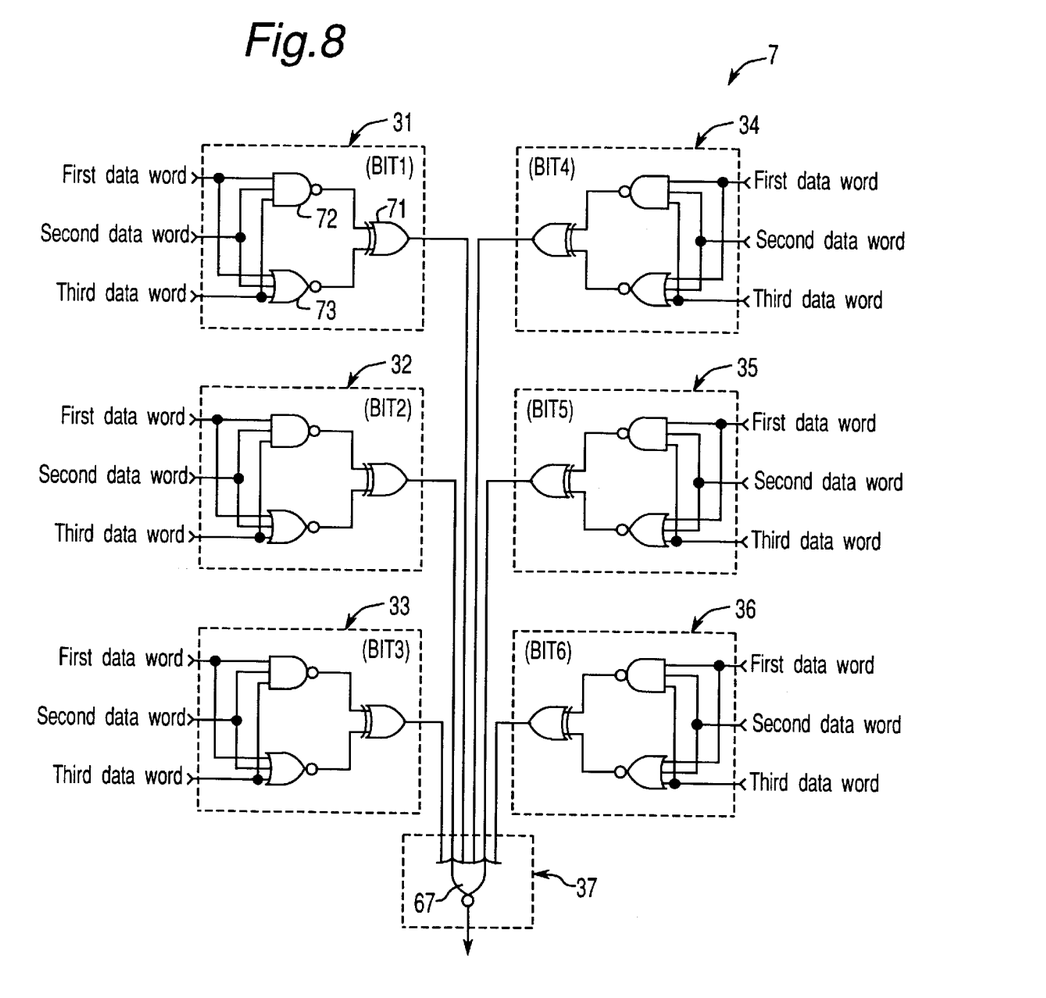
FIG. 8 is a circuit diagram illustrating still another variant of the self-diagnosis circuit section 7 in FIG. 1.

The Ex.OR circuits having 3 inputs that form first to sixth judgment circuits 31 to 36 can be composed by circuitry different from the logic circuits shown in FIG. 7. A different circuit of self-diagnosis circuit section 7 is illustrated in FIG. 8 in the case where first to sixth judgment circuits 31 to 36 are composed of other logic circuits. In FIG. 8, the first to sixth judgement circuits 31 to 36 are identical circuits except their different inputs. Therefore, the circuit of first judgement circuit 31 is described in the following.

Referring to FIG. 8, first judgment circuit 31 is composed of an Ex.OR circuit 71 having 2 inputs, a NAND circuit 72 having 3 inputs, and a NOR circuit 73 having 3 inputs. Error-signal output circuit 37 is formed of a NOR circuit 67 having 6 inputs.

Inputs of NAND circuit 72 are respectively connected to the inputs of NOR circuit 73. These connections form the inputs of first judgment circuit 31. They are connected to data storage section 5, receiving BIT1 of the first to third data words. The outputs of NAND circuit 72 and NOR circuit 73 are respectively applied to the inputs of Ex.OR circuit 71. The output of Ex.Or circuit is the output of first judgment circuit 31 and connected to one input of NOR circuit 67.

In this circuitry, if all BIT1 of the first to third data words are 0 or if all BIT1 of the first to third data words are 1, then any of BIT1 stored in data storage section 5 has not changed and remained normal. In this case, the output of Ex.Or circuit 71 becomes LOW level. If not all BIT1 of the first to third data words are 0 or if not all BIT1 of the first to third data words are 1, then at least one of BIT1 of the three data words stored in data storage section 5 has changed and something abnormal has happened. In this case, the output of Ex.OR circuit 71 becomes HIGH level.

The outputs of Ex.OR circuits 71 in first to sixth judgment circuits 31 to 36 are respectively applied to the inputs of NOR circuit 67 that forms error-signal output circuit 37. If all outputs of NOR circuits 51 of first to sixth judgment circuits 31 to 36 are at LOW level, then the output of error-signal output circuit 37, that is, the output of NOR circuit 67 becomes HIGH level. Therefore, in this case, error-signal output circuit 37 indicates to control circuit 8 that there has been no abnormality in the data stored in data storage section 5. Control circuit 8 then performs predetermined processing of the signal input from amplifier section 4.

If, on the other hand, at least one of the outputs of Ex.OR circuits 71 in first to sixth judgment circuits 31 to 36 is at HIGH level, then the output of error-signal output circuit 37, that is, the output of NOR circuit 67 becomes LOW level. Therefore, in this case, error-signal output circuit 37 indicates to control circuit 8 that there has been an abnormality in the data stored in data storage section 5. Control circuit 8 then performs predetermined processing for the abnormality.

As described above, the physical parameter sensor in the preferred embodiment of the present invention detects whether a plurality of data words stored in data storage section 5 is identical or not. If the originally identical data words have been altered by some cause to become nonidentical, then self-diagnosis circuit section 7 outputs an error signal into the outside of the sensor. Consequently, the present invention can detect, by means of simple circuits, changes in data that is stored beforehand for adjustments in data storage section 5 when the changes in the data are not corrected by majority-decision circuit section 6. Further, the physical parameter sensor can prevent the use of an output signal obtained by adjustments based on incorrect data, so that the present invention can improve the reliability of physical parameter sensors.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A physical parameter sensor that detects a physical parameter, said physical parameter sensor comprising:

a sensor section that converts a physical parameter into an electric signal, a signal processing section that performs signal processing of the electric signal converted by said sensor section, an amplifier section that amplifies the signal processed by said signal processing section, a data storage section that stores, as a plurality of identical data words, digital data for adjusting the signal processing performed by said signal processing section and for adjusting said amplifier section, a majority-decision circuit section that performs a majority decision for each set of corresponding bits in the plurality of digital data words stored in said data storage section to output a digital data word generated by said majority-decision into said signal processing section and said amplifier section, a self-diagnosis circuit having, a judgment circuit section that detects whether the plurality of data words stored in said data storage section are identical or not by consecutively judging whether a corresponding bit of all stored data words are identical and outputs a result of judgment, and an error signal output section that generates an error signal if the result of judgment indicates all stored data words are not identical and outputs the error signal to an external control circuit to which an output of said amplifier section is input, thereby indicating a possibility of error generation in the output of said physical parameter sensor to said external control circuit.

2. The physical parameter sensor defined in claim 1, wherein said judgment circuit section judges in units of bits whether the data words stored in said data storage section are identical or not and outputs the result of judgment; and said error-signal output section generates and outputs a predetermined error signal if the result of judgment indicates that the data words are not identical.

3. The physical parameter sensor defined in claim 2, wherein said judgment circuit section has inputs that correspond to the number of data words stored in said data storage section and is formed of exclusive NOR circuits that correspond to the number of bits in each data word stored in said data storage section, and said error-signal output circuit is formed of a NAND circuit that has inputs corresponding to said exclusive NOR circuits.

4. The physical parameter sensor defined in claim 2, wherein said judgment circuit section has inputs that correspond to the number of data words stored in said data storage section and comprises exclusive OR circuits that correspond to the number of bits in each data word stored in said data storage section, and said error-signal output circuit is formed of a NOR circuit that has inputs that correspond to said exclusive OR circuits.

* * * * *